Oct. 6, 1964  H. FAURE ETAL  3,151,865
APPARATUS FOR STEERING A MOVING BODY SUCH AS
A TOY VEHICLE ALONG A PRESET PATH
Filed Aug. 10, 1960  5 Sheets-Sheet 1

INVENTORS
HENRI FAURE
GERARD DE CHATELPERRON
GERARD ETIENNEY
BY Irwin S. Thompson
ATTORNEY

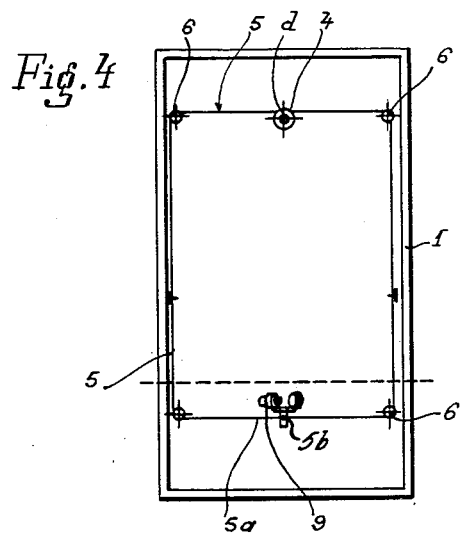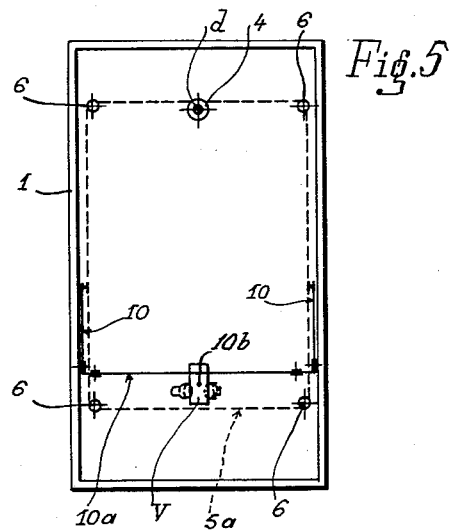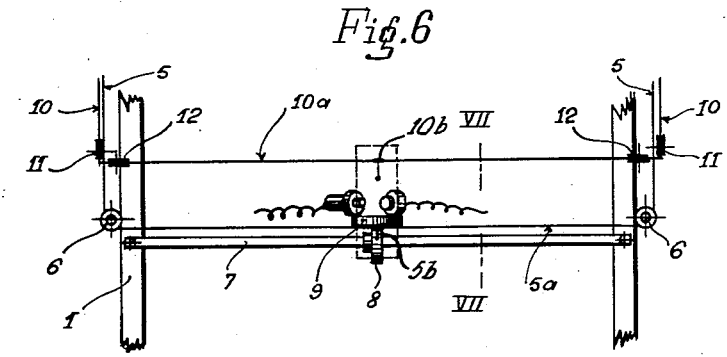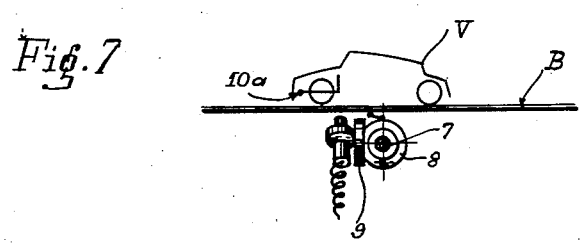

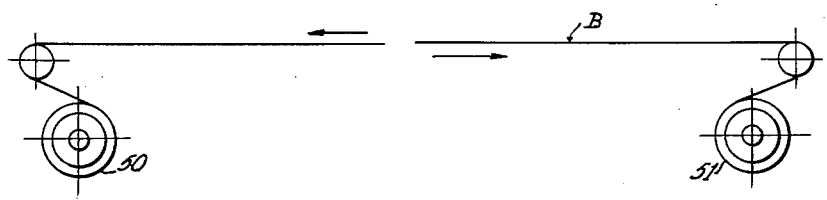
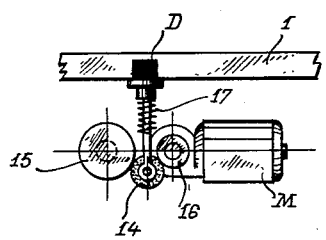
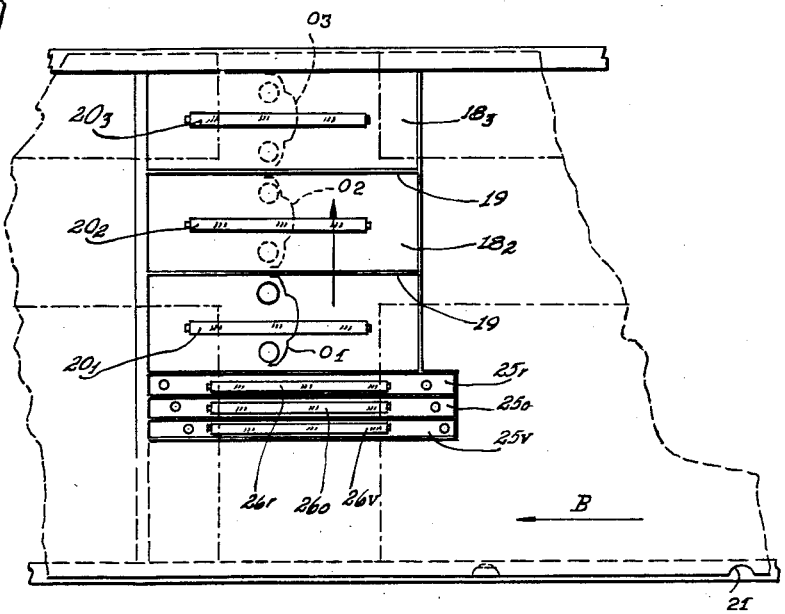
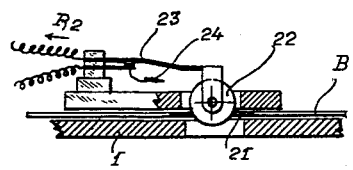

Oct. 6, 1964    H. FAURE ETAL    3,151,865
APPARATUS FOR STEERING A MOVING BODY SUCH AS
A TOY VEHICLE ALONG A PRESET PATH
Filed Aug. 10, 1960    5 Sheets-Sheet 5

INVENTORS
HENRI FAURE
GERARD DE CHATELPERRON
GERARD ETIENNEY
BY Irwin S. Thompson
ATTY.

United States Patent Office 3,151,865
Patented Oct. 6, 1964

3,151,865
APPARATUS FOR STEERING A MOVING BODY SUCH AS A TOY VEHICLE ALONG A PRESET PATH
Henri Faure, 32 Ave. Mendiguren, Nice, France; Gérard De Chatelperron, Chassimpierre, Chatelperron, France; and Gérard Etienney, 5 Rue de France, Nice, France
Filed Aug. 10, 1960, Ser. No. 48,656
Claims priority, application France, Sept. 3, 1959, 6,535, Patent 1,234,086
9 Claims. (Cl. 273—1)

This invention relates to an apparatus in which any movable body such as a toy vehicle can be steered along a preset path shown on a belt or strip while taking notice of certain rules, said apparatus being adapted automatically to indicate occurring faults or mistakes.

The invention is described hereafter in connection with a toy vehicle employed in a game for keeping said vehicle along a correct path by taking notice of a highway code along a road shown on a rollable belt or strip and illustrating sinuosities, obstacles, crossings and road notices. But the invention is applicable more generally to any other toy, game or similar appliance using the same means.

An object of the invention is to provide an apparatus comprising a frame including a road-figurating belt, band or strip actuatable lengthwise by a motor by being unwound from a reel and wound on another reel at varying speeds at the operator's (player's) choice and a transverse guide along which the operator can move the vehicle overlying the road sketched on the belt and an equipment located under the belt and constituted by a photoelectric cell and its energizing lamp, said cell and lamp being so angularly set with respect to each other and to the belt that the light rays from the lamp are reflected by the belt rear surface toward said cell.

Another object of the invention is to provide an apparatus as aforesaid comprising a rope transmission operated from a wheel simulating the steering wheel of a motor car and forked into a pair of superimposed transverse runs one of which having the front end of the vehicle fixed thereto passing over the belt while the other one having the cell lamp equipment fixed thereto passes under the belt, the points of attachment of the vehicle and cell and belt equipment being such that the front end of the vehicle and the reflecting point between the lamp and the cell are substantially aligned vertically.

As a consequence of this arrangement, the cell is energized by its lamp only if the light rays from the lamp are reflected toward a blank portion or a sufficiently reflecting surface of the belt. An important feature of the apparatus according to the invention resides in the fact that the rear surface of the belt bears in zones corresponding to obstacles or prohibition areas shown on the belt in black or tinted areas capable of absorbing the light rays and sufficiently reducing the intensity of the reflected light toward the cell for causing the latter to cease to be operative. The energized cell controls a relay which cuts out a contact connected to the circuit of a signal or warning member such as a lamp. When a non-reflecting zone on the rear surface of the belt is reached by the cell as though a real car would reach a real obstacle, the cell ceases to be energized whereupon the secondary circuit is closed and the occurring fault is indicated.

Actually a series of lamps are provided and are placed under the action of a step-by-step selector so that whenever the highway code is encroached upon somehow, there is a new lamp which is ignited after the previous lamps, thereby registering and totalizing the number of faults caused during the vehicle travel.

Preferably use is made for delineating areas on the rear surface of the belt of non-reflecting transverse stripes separated by blank or reflecting intervals or lands and there is connected in parallel with the aforesaid signalling circuit a time lag relay the operation of which cuts out the feeding circuit for the belt-unwinding motor, timing of this relay being set in accordance with the time it takes for a light-absorbing stripe to pass before the cell. If de-energization of the cell is of short duration and matches the time it takes for passing a stripe, only an impulse is produced which sets the advance of the selector while igniting a signalling light. However if the cell meets a continuous non-reflecting area of large width, de-energization will last for a longer time whereupon the time lag relay becomes operative and cuts off the current to the belt-feeding motor so that the apparatus is stopped. This happens for example where in actual reality a real car would have hit an impassible obstacle.

A further object of the invention is to provide an apparatus as aforesaid adapted to figure out on a miniature scale crossings and priority rules of a highway code wherefor some points of the belt are shown which represent crossings between the highway and cross ways along which vehicles travel. For simulating their movability, the known method is used consisting in sequentially illuminating sketches showing the movable body (toy vehicle or the like) in successive positions. For that purpose the representation of a car whose path will be crossed is repeated a number of times at successive positions along the cross road while under the belt on a width and length largely exceeding that of a crossing the apparatus frame has a similar number of compartments separated from one another by longitudinal partitions, each one of which contains a lamp adapted temporarily to illuminate the car pattern which passes over said compartment. The several lamps are sequentially lit up from one compartment to the next compartment (from the right hand side to the left hand side of the operator or player) when dealing with the problem of testing compliance with highway code priority rules by a rotary switch actuated by a motor independent of the belt-feeding motor. The belt edge has a notch cooperating with the lever of a contact tapped to the circuit of a relay adapted to cut out the belt-feeding motor. Normally as said lever rests upon the belt it holds said contact in opened position. However when the belt edge notch comes into coincidence therewith, it drops and closes the contact which operates the cut-out relay. The contact is so arranged on the apparatus frame that if the operator failed timely to stop or slacken the belt for causing the belt notch to reach the contact lever only after the priority car has passed, the contact operates and sets into action the cut-out relay. In order that said action occurs unexpectedly only when a priority car passes off the operator, the aforesaid device is associated with a rotary switch connected to the circuit of the cut-out relay and controlled by a motor independent of the belt-feeding motor.

Similar devices including a contact controlled by a belt notch are provided for other occurrences, particularly for signalling out the lack of compliance with those traffic lights which regulate traffic on highways.

With these and such other objects in view as will incidently appear hereafter, the invention comprises the novel parts and combination of parts that will now be described with reference to the accompanying diagrammaic drawings exemplifying the same and forming a part of the present disclosure.

In the drawings:
FIGURES 1 and 2 are views respectively showing the front surface of the unrollable belt, band or strip used in the apparatus and its rear surface.

FIGURES 4 and 5 are similar plan views taken at different levels, the former showing the rope fastened to said equipment while the latter shows both the previous rope and that rope which is fastened to the toy car.

FIGURE 6 is an enlargement of a portion of FIG. 5.

FIGURE 7 is a partial vertical sectional view on the line VII—VII of FIG. 6.

FIGURE 8 is a detail elevational view showing the belt and the rollers for winding the same.

FIGURE 9 is a detail elevational view of the belt-clutching up device.

FIGURE 10 is a partial plan view of the apparatus frame showing its two groups of compartments, one of which corresponds to the showing of a priority car travelling crosswise of the road followed by the operator's or player's car, while the other one is a showing of the usual traffic lights respectively of green, orange and red colors.

FIGURE 11 is a vertical sectional view showing the constructional details of the contact operated by a side notch in the belt edge.

Figure 1:
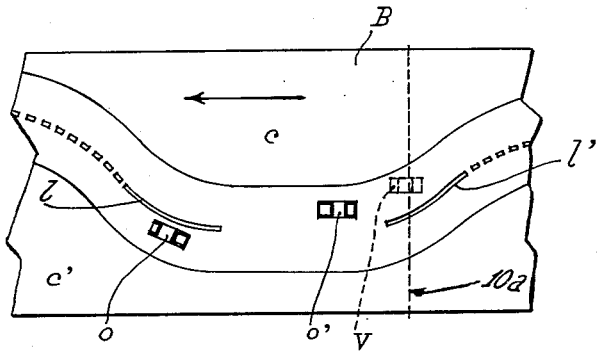

It will be seen from FIGURES 3 to 7, that the apparatus frame includes a steering wheel 2 the angular motions of which are transmitted by an endless rope or cable 3 to a vertical axis $d$ which carries a control pulley 4 on which is frictionally wound an endless rope or wire 5 which also passes on four jockey rollers 6 so that its run 5a moves in front of the operator or player parallel to a transverse guide 7 (FIG. 6) provided on the frame 1. Along said guide may slide a runner 8 fastened to a point 5b of the rope 5a and carrying the equipment including the photoelectric cell and its energizing lamp. Such equipment and its control rope 5a are situated just underneath the belt B which is a representation of the road. This belt can be unrolled lengthwise of the frame between the usual alternate reeling roller 50 and unreeling roller 51 (FIG. 8). A second rope 10 (FIGS. 5 and 6) whose ends are secured at suitable positions of the side runs of the rope 5 passes over two pairs of jockey rollers 11, 11 and 12, 12 so that its transverse run 10a extends over the belt B (FIG. 7). The toy vehicle V to be steered has its front end attached at one point 10b of the rope 10a so as to cause said vehicle and the impact zone of the lamp rays with the belt between said lamp and the cell to be situated over each other.

Figure 3:
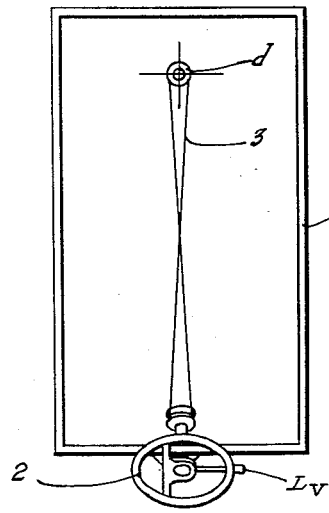
FIGURE 3 is a diagrammatic plan view of the apparatus frame showing the control by means of a steering wheel and a rope system of the toy car to be steered and the photoelectric cell and lamp equipment.

A pair of electric motors are provided for actuating the belt B. One of them is designated by M (FIGS. 9 and 12) for shifting the same in accordance with the game phase. The other one designated by Z (FIG. 12) performs its return winding motion in a reverse direction on its inoperative roller. A change speed gear is also provided as described hereafter and is controlled by means of a lever $L_v$ positioned adjacent the steering wheel 2 (FIGS. 3 and 13). A clutching and declutching device shown diagrammatically by FIG. 9 is constituted as follows: A friction roller 14 interposed between a driven roller 15 and a roller 16 actuated by the motor M is held, during the normal operation of the apparatus while the game is being played, in contact with said rollers 15 and 16 by the action of an electro-magnet D when the latter is energized so as to transmit the motion from the motor M to the belt B. As soon as the electro-magnet D is de-energized, the roller 14 is moved off the rollers 15 and 16 by a return spring 17 and thus ceases to impart motion to the belt B.

Figure 2:
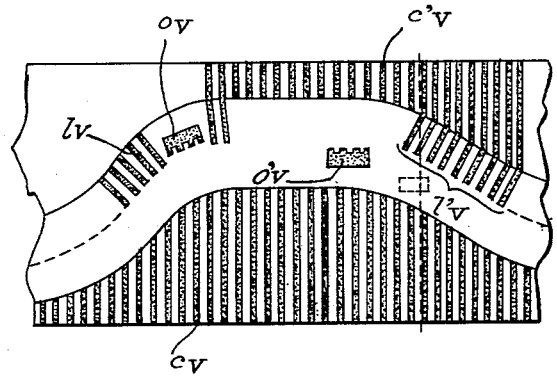

The front surface of the belt B bears the showing of a road. In that portion represented in FIG. 1 are shown middle longitudinal lines $l$, $l'$ which should not be passed, sidings $c$, $c'$ which may be regarded as utilizable though it is better to avoid them and obstructive cars $o$, $o'$ which have to be crossed or overtaken. The vehicle V has a transverse run 10a as shown in FIG. 1. According to the essential feature of the invention, at positions corresponding to the several obstacles shown on the front surface of the belt and over their entire surface the rear surface of the belt is so blackened or tinted or hatched (see FIG. 2) as sufficiently to absorb the rays from the cell-energizing lamp i.e. sufficiently to lessen their reflection by the belt B to discontinue energization of the cell. So far as those obstacles are concerned which cannot be reached or passed without causing an accident (for example obstructive cars such as $o$, $o'$ as shown in FIG. 2) the corresponding tinted areas $o_v$, $o_v'$ are continuous and of sufficient extent. So far as areas are concerned which are merely incorrect or prohibited, for example prohibition lines $l$, $l'$ and sidings $c$, $c'$, the corresponding areas $l_v$ and $c_v$ are provided on the rear surface of the belt with narrow transverse parallel stripes separated by reflecting intervals.

FIG. 13 illustrates the automobile simulator toy with vehicle V having a transverse run 10a along belt B having sidings C and C'. The simulator is controlled by steering wheel 2, speed change lever $L_v$ and starting button 27.

At some locations, the front surface of the belt shows crossings, for example the crossing constituted by the cross way represented in dot and dash line in FIG. 10. The rear surface of the belt shows along this cross way in tinted or transparent fashion the obstructive car occupying three (or more) successive positions $O_1$, $O_2$, $O_3$ from the right to the left of the operator or player, assuming said car to have a priority right of passage. In accordance with this showing, the apparatus frame comprises three compartments $18_1$, $18_2$, $18_3$ separated by longitudinal partitions 19 and respectively containing lamps $20_1$, $20_2$, $20_3$ which are successively ignited by the action of a motor controlled switch so as to cause the illumination $O_1$, $O_2$, $O_3$ successively to show the advance of the obstructive vehicle which stands in the way of the player's vehicle V. Should this vehicle not have enough time to pass before $O_1$, the operator or player may depress a button arranged near the steering wheel and thus cut off the electric current to the declutching electro-magnet D (see FIG. 9) thereby slowing down or stopping the motion of the belt B until the obstructive vehicle appears at $O_3$. Where conversely the operator allows the obstructive vehicle appearing at $O_2$ i.e. as said vehicle crosses over the longitudinal highway to reach the position of the steered vehicle V, which, in actual reality, would mean a collision, a notch 21 provided in the edge of the belt B at a suitable position of its length (see FIG. 11) permits a small roller 22 to drop into it whereas said roller was previously running along the belt B and when thus dropping makes a contact between its movable contact 23 and the stationary contact 24, thereby energizing a cut-out relay $R_2$ described hereafter and consequently stopping the motor M.

A similar contrivance is figurative of the prohibition or no-passage lights, wherefor the apparatus frame includes three longitudinal comparts $25_v$, $25_o$ and $25_r$ respectively housing lamps, namely a green lamp $26_v$, an orange lamp $26_o$ and a red lamp $26_r$ which are successively lit up by a motor controlled switch. A device similar to the one shown in FIG. 11 and also having an edge notch in the belt B actuates the the cut-out relay $R_2$ for bringing the apparatus to a standstill.

Two further similar switches including corresponding notches provided at the ends of the belt B serve for stopping either the front drive motor or the rear drive motor when the belt B reaches the end of its stroke.

Figure 12:
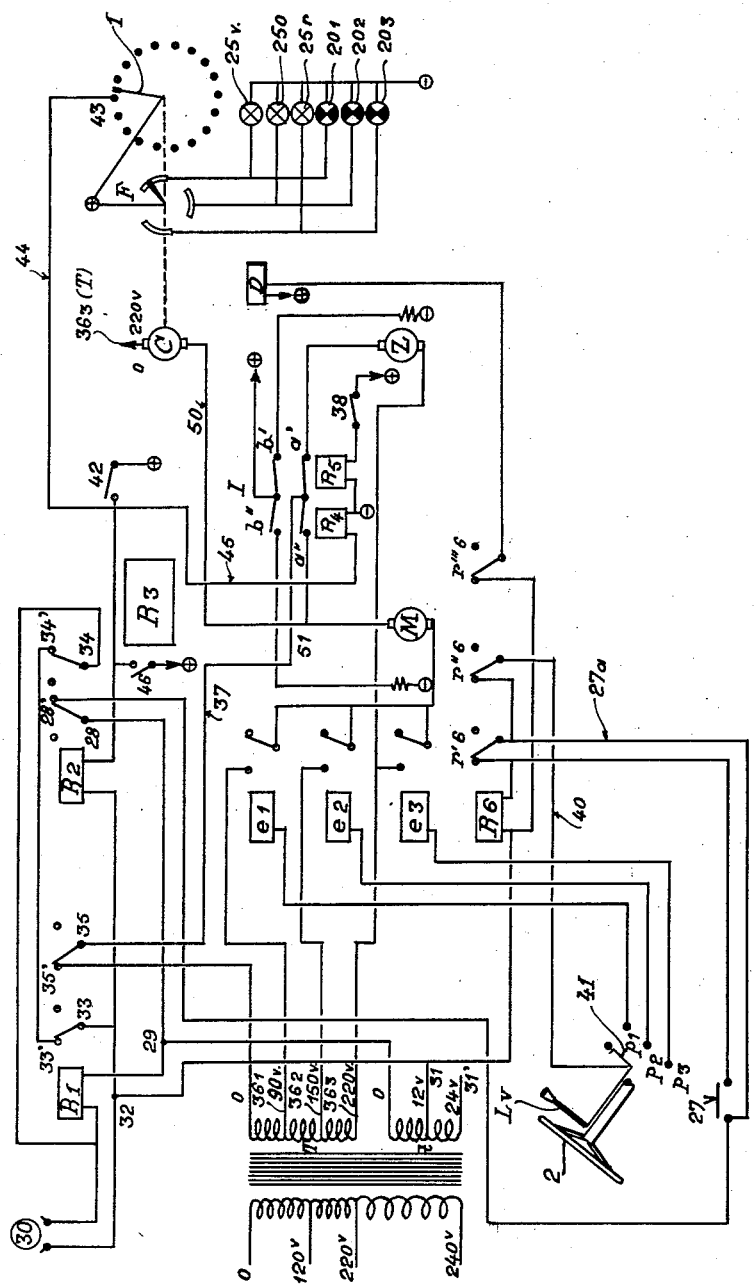
FIGURE 12 is a view showing the entire wiring diagram of the apparatus.
Figure 13:
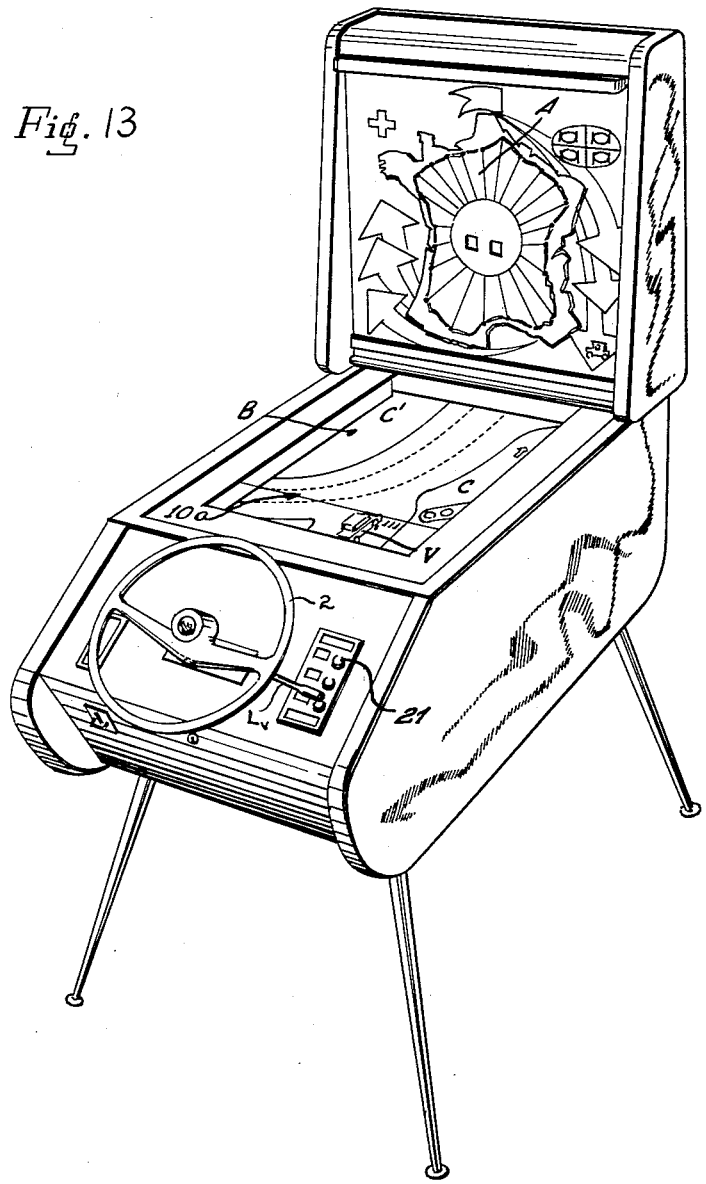
FIGURE 13 is a perspective view of a vehicle simulator toy embodying the invention.

In the showing of FIG. 12 is illustrated the wiring of the apparatus. $t$ and T designate the secondary windings of a transformer adapted to supply a low voltage (12 or 24 volts) and high stepped voltages, for example 90 or 150 or 220 volts. M designates the belt-unwinding motor which is operative while the game is being played. Z designates the belt-rewinding motor adapted to wind the belt upon its inoperative or delivery reel. The lever $L_v$ mounted near the steering wheel 2 permits a speed change of the motor M and belt. Another motor C operates through a mechanical connection represented by broken line 53 both a chronometric pointer A and a rotary switch F which sequentially ignite in the compartments 25 of the frame the green, orange and red lights respectively and in the compartments 18 those lights $20_1$, $20_2$ and $20_3$ which indicate priority of passage at cross over points.

D is the electro-magnet which controls the declutching action as visualized by FIG. 9. $R_1$ is a relay actuated by inserting a coin into a slot in the apparatus casing. $R_2$ is a cut-out and stopping relay. $R_3$ is the time relay which stops the apparatus if the photoelectric cell remains de-energized for a long time. $R_4$ and $R_5$ are contactors which operate a reversing switch I for changing over the action of the motors M and Z. $R_6$ is a holding relay which maintains the operation. $e_1$, $e_2$ and $e_3$ are contactors controlled by the speed change lever $L_v$ for applying different voltages to the motor M and causing it to run at different speeds.

The operation takes place as follows:

In the first instance, the operator or player depresses the starting button 27 situated near the steering wheel 2, thereby energizing the relay $R_6$ through the following circuit: 31 (or 31') of the secondary winding $t$ of the transformer, relay $R_6$, contact at 27, contact 28'–28 of relay $R_2$ which is normally closed, point 29 and back to said winding $t$. To this circuit is at once substituted another circuit passing through the holding shunt $27_a$ which short-circuits the button 27 since the relay $R_6$ has closed its contacts, particularly the one designated by $r'_6$. Closure of the contact $r'''_6$ energizes the electro-magnet D which holds the roller 14 (see FIG. 9) in clutching position. Closure of $r''_6$ connects the low voltage feed through a lead 40 to the contact wiper 41 of the speed change lever $L_v$, thereby creating a possibility, owing to proper manipulation of this lever, subsequently to energize either the one or the other of the contactors $e_1$, $e_2$, $e_3$.

However as the belt B is assumed to be shifted, after the preceding game to the roller located near the player, it is necessary for it to be first rewound upon its inoperative or outset roller.

A conventional coin 30 is inserted through a slot in the apparatus casing. Said coin passes between a pair of contacts and closes the following electric circuit: 31 or 31' (12 or 24 volts) of the secondary winding $t$ of the transformer, point 32, coin 30, relay $R_1$, and back to $t$, thereby closing the contact 33–33'. To this circuit is immediately substituted the following circuit before 30 has left its contacts: 31 or 31', point 32, 33–33', 34–34', relay $R_1$ and back to $t$. At the same time, as the relay $R_1$ has closed 35, 35', the following circuit is made: $36_1$ or $36_2$ or $36_3$ of the secondary winding T of the transformer, motor Z, contact $a'$–$a$ of the reversing switch I, lead 37, contact 35–35' and back to T. As the inductor of the motor Z is set under voltage by the closed contact $b'$ of the reversing switch I, the motor Z is automatically set into motion, thereby winding the belt B on its outset reel. As the winding operation reaches its end, a contact (similar to the one shown in FIG. 11) controlled by a suitable notch in the belt B closes the contact 38 and energizes the relay $R_5$ which rocks the reverse switch I while cutting off the contacts at $a'$ and $b'$, thereby stopping the motor Z and closing the contacts at $a''$ and $b''$, which applies voltage on the inductor $m$ of the motor M and feeds electric current to its armature through a supply circuit under a more or less high voltage depending upon whether the speed change lever $L_v$ closes the contact by the one, or the other of the contacts $P_1$, $P_2$, $P_3$. The circuit may be for example as follows: point $36_1$ of the secondary winding T of the transformer contact closed by $e_1$, motor M, contact $a''$–$a$ of the reversing switch I, lead 37, contact 35–35' of the relay $R_1$ and back to the secondary winding T of the transformer.

Simultaneously as M, the motor C which drives the chronometric pointer A as well as the commutator of the lamps 20 and 25 is fed by the following circuit: $36_3$ of the secondary winding T of the transformer, lead 50, point 51, contact $a''$–$a$ lead 37, contact 35–35' and back to said winding T. It will be seen that the motor C fed by a single voltage equal to 220 volts is rotated at a constant speed while the motor M fed by varying voltages is rotated at speeds which vary according to the operator's choice.

If the belt B reaches the end of its stroke, a contact similar to the one shown in FIG. 11 drops into a corresponding notch in the belt B, thereby closing the contact 42, while energizing the relay $R_2$ which opens the contacts 34' and 28'. The circuit which held the relay $R_1$ in energized condition is thus cut off and the apparatus is stopped.

Where, prior to the belt B having completed its full stroke, the pointer A of the chronometer resumes its starting position, as it is connected to the low voltage terminal, it closes at 43 the following circuit: A, 43, leads 44 and 45, relay $R_4$ and then to ground. The energized relay $R_4$ rocks the reversing switch I, cuts off the contacts $a''$, $b''$ and stops the motor M.

Should, as the belt B is being unwound, the operator or player allow the vehicle B to reach a prohibited but passable position (prohibition line or utilizable sidings) the cell-energizing light beam hits on the rear side of the belt B successive absorbing stripes which intermittently cut off the current applied by the photoelectric cell to a relay (not shown) which at each action advances by one step a stepwise actuated selector, thereby lighting up in the known fashion successive lamps the number of which thus indicates a number of bad marks connoting the duration of the travel on a prohibited zone.

Where the encountered obstruction is unpassable, the light beam reflected toward the cell hits a continuous and sufficiently extensive absorbing land, whereupon the time relay $R_3$ being energized by the cell operates and closes the contact 46, and the cut off relay $R_2$ is energized by the following circuit: 31 of the secondary winding $t$ of the transformer, 32, relay $R_2$, 46 and then to ground, thereby cutting off the contacts 28' and 34' so that the apparatus is stopped.

The contactors in FIG. 11 and the corresponding notches in the belt B in conjunction with the system of traffic lights (lamps 25) and the priority passage lights (lamps 20) are not shown. They may be tapped to the circuit of the cut off relay $R_2$ so that if the traffic rules are transgressed they close the energizing circuit of said relay and stop the apparatus.

Minor constructional details may be varied without departing from the scope of the subjoined claims.

What is claimed is:

1. An apparatus for steering a toy vehicle along a preset path comprising a band having the path represented on the front surface thereof, motor means for longitudinally moving said band, a toy vehicle mounted adjacent the front surface of said band, manually actuated means for moving said toy vehicle transversely of the band, a photoelectric assembly comprising a photocell and a lamp for energizing said photocell positioned beneath the band and cooperating with the rear surface of the band to reflect a beam of light from the lamp to the photocell, said photoelectric assembly being movable beneath the band, means connecting said photoelectric assembly with the toy vehicle to move transversely of the band with the vehicle so as to remain constantly beneath the vehicle, the front surface of the band having obstacles and areas from which a vehicle is prohibited represented thereon and the rear surface of the band having obstacles and areas, in register with those on the front surface, coated with light absorbing material so that when said photoelectric assembly is beneath these obstacles and areas of light absorbing material, energization of the photocell will be interrupted, a relay controlled by said photocell and being operable to produce a signal that the vehicle has entered a forbidden area on the front surface of said band.

2. An apparatus according to claim 1 in which said relay is a time-lag relay, a cut-out relay controlled by said time-lag relay for de-energizing said motor means to stop said band after a predetermined time has lapsed upon actuation of said time-lag relay.

3. An apparatus according to claim 1 in which the front surface of said band contains a representation of an obstructive vehicle in sequential positions along a transverse portion of said band, a notch disposed at one side of said band, said notch being longitudinally spaced along said band a short distance from each representation, a plurality of successive compartments disposed adjacent the rear surface of said band and extending transversely thereof, each compartment having a light means, a motor actuated switch operatively connected to said light means to sequentially ignite said light means in each compartment, and switch means operatively connected to a cut-out relay and an energy circuit for said motor means including said cut-out relay, said switch means having a roller thereon disposed adjacent said one side of said band so that said roller rolls along said band to maintain said switch means inoperative and said roller engages said notch to cause said switch means to operate and actuate said cut-out relay to stop said apparatus.

4. An apparatus according to claim 1 in which successive compartments are transversely disposed adjacent the rear surface of said band, each compartment having a light means of different color corresponding to normal traffic regulating lights, a motor actuated switch operatively connected to said motor means and to said light means to sequentially ignite said light means in each compartment, and switch means operatively connected to a cut-out relay, said switch means having a roller thereon disposed adjacent said one side of said band so that said roller rolls along said band to maintain said switch means inoperative and said roller engages said notch to cause said switch means to operate and actuate said cut-out relay to stop said appartus.

5. An apparatus according to claim 1 in which said motor means is a multiple speed motor, a source of supply having multiple voltage sources, each multiple voltage source connected to a relay member, said motor means connected to each relay member, a selectable switch mounted on said manually actuated means and being connected to each relay member so that upon actuation of said selectable switch one of the relay members will be energized to connect one of the multiple voltage sources to said motor means to drive said motor at a predetermined speed.

6. An apparatus according to claim 1 in which said motor means is operatively connected to longitudinally drive said band through clutch means, and electromagnetic means operatively connected to said clutch means to connect and disconnect said motor means to said band to drive said band.

7. An apparatus according to claim 1 in which said band has a notch at each end, a roller switch disposed adjacent said band and being operatively connected to a cut-out relay, said roller switch having a roller which bears upon said band to maintain said roller switch open and when said band reaches one of its ends said roller engages said notch therein to actuate said roller switch and energize said cut-out relay to stop said apparatus.

8. An apparatus according to claim 7 in which said cut-out relay is operatively connected to a reversing switch, one side of said reversing switch is connected to said motor means to longitudinally move said band in one direction, when said roller engages the notch at one end of said band, the other end of said reversing switch is connected to a further motor means independent of said motor means to move said band in a reverse direction when said roller engages the notch at the other end of said band.

9. An apparatus for guiding a toy member along a preset path comprising a band having the path represented on the upper surface thereof, motor means for longitudinally moving said band, a toy member mounted adjacent the upper surface of said band, manually actuated means for moving said toy member transversely of the band, a photoelectric assembly comprising a photocell and a lamp for energizing said photocell positioned beneath the band, said photoelectric assembly being movable beneath the band, means connecting said photoelectric assembly with the toy member to move transversely of the band with the toy member so as to remain constantly beneath the toy member, the front surface of the band having obstacles and areas from which said toy member is prohibited represented thereon and the rear surface of the band having obstacles and areas in register with those on the upper surface, said preset path being represented on the rear surface in register with the preset path on the upper surface, one of said obstacles and areas and preset path on the rear surface having light reflecting properties to reflect a beam of light from the lamp to the photocell, one of said obstacles and areas and preset path on the rear surface having light absorbing properties to aborb a beam of light from the lamp to interrupt energization of the photocell and a relay controlled by said photocell and being operable thereby to produce a signal that the toy member has entered a forbidden area on the front surface of said band.

References Cited in the file of this patent

UNITED STATES PATENTS

| 2,148,828 | Myers | Feb. 28, 1939 |
| 2,265,598 | Firestone et al. | Dec. 9, 1941 |
| 2,331,144 | Sitten | Oct. 5, 1943 |
| 2,943,855 | Javna et al. | July 5, 1960 |

FOREIGN PATENTS

| 446,214 | Great Britain | Apr. 27, 1936 |